A. B. Davis,
Plow.
No. 93,284. Patented Aug. 3, 1869
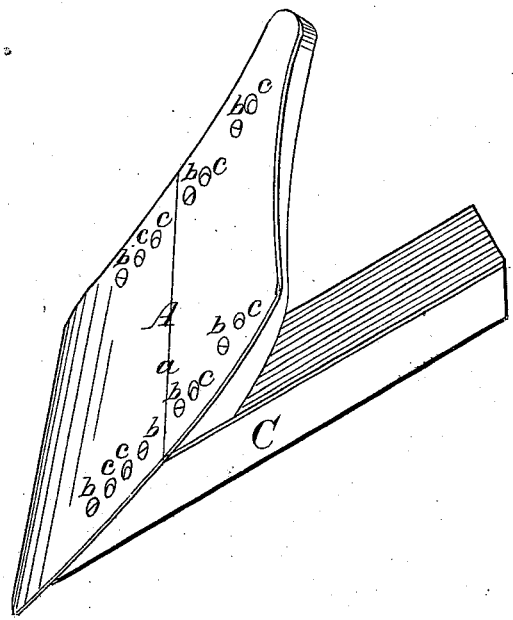
Witnesses-
Inventor-
A. B. Davis

UNITED STATES PATENT OFFICE.

ANDREW B. DAVIS, OF CATAHOULA PARISH, LOUISIANA.

IMPROVEMENT IN PLOWS.

Specification forming part of Letters Patent No. 93,284, dated August 3, 1869.

*To all whom it may concern:*

Be it known that I, ANDREW B. DAVIS, of Catahoula parish, in the State of Louisiana, have invented a certain new, useful, and Improved Method of Constructing Plows; and I do hereby declare the following to be a full, clear, and exact description of the same, reference being had to the annexed drawing, making a part of this specification, in which it is illustrated by a perspective view.

Before entering on a description of my improvement, and with a view to show its importance and value, it will not be out of place to refer briefly to the well-known fact that plows, as at present constructed, whatever may be their form, or the purpose they are specially designed to subserve, quickly wear away in the using of them, particularly at and near their points, to such an extent as to make it necessary to throw them away, or else to incur a heavy expense to have them repaired.

When the plow is of cast-iron the first alternative is invariably the consequence, nor is it always in the power of the farmer or agriculturist to have wrought-iron or steel plows repaired, because of the want of skill or the want of proper tools, or other necessary means for making the repairs on the part of the only blacksmiths that are accessible to him, and hence it follows that even in the case of the more expensive plows of this description they have to be permanently thrown aside and new ones substituted in their place.

My invention provides a cheap and simple remedy against these crying evils, and, furthermore, makes it not only possible but very easy to restore to use, as good as when new, thousands of plows that are now lying idle as dead capital, because unfit for use from being worn on their points and edges.

My invention consists simply in covering plows of every kind and variety with a thin plate of steel or hardened wrought-iron on their front or turning faces, and on their landsides, in such manner that the same are adjustable and removable not only by ordinary mechanics, but by the dullest laborers, in a few minutes of time; but my invention will be better understood by referring to the drawing, wherein it is shown in connection with an ordinary turning-plow of somewhat rude construction and imperfect form.

A represents what I call the "face-plate," which, it will be observed, is divided transversely across the mold-board at the point $a$, so as to consist of two distinct sections, that secured to the plow B, which we may suppose to be of cast-iron, by bolts $b$ passing through holes $c$, and taking in the body of the plow by means of screw terminations, or else passing entirely through the same to receive on their lower extremities screw taps or nuts sunk in recesses made to receive them, so as not to extend below the lower surface of the plow, or the bottom thereof, and thus to interrupt the smoothness of the said surface.

The bolts $b$ and holes $c$ may occupy the positions shown on the drawing, or any other that will equally as well secure the plate A firmly in its place.

The object of dividing the plate A in sections is to facilitate the removal of the lower section whenever it is too much worn for effective use, to be repaired or replaced with a new one.

The holes $c$ afford a means for adjusting the plates lower down as the lower one wears away, so as to keep its point and lower edge always a little before and lower down than the point and lower edge of the plow proper.

In some forms of plows no sectional division of the covering-plate will be needed, and I reserve the right to make this plate in a single piece whenever I deem it expedient, or to increase the number of sections of which it is composed, if, for any reason, more than two are necessary.

To make the protection complete I put on the land-side of the plow a similar thin plate-cover, C, as shown, and in some cases I may even cover the bottom of the plow in the same manner; but I do not believe this will be necessary except in extreme and rare cases.

The plates should be a quarter of an inch thick, or thereabout.

It will be seen that old worn-out plows may be restored to usefulness and efficiency by the application of my covering-plates, and that this may be done by the most ordinary country blacksmiths, and at very little cost.

Old saw-blades, carriage-springs, and a variety of other similar things now of no practical value, may be readily converted into covering-plates and put on plows, both new and old, as well to replace a worn-out plate as to cover the plow in the first place.

Having thus described my invention, what I claim, and desire to secure by Letters Patent, is—

Covering plows on their front faces, and on their land-sides, with a series of thin steel or hardened-iron plates, A and C, substantially as herein described, for the purpose set forth.

ANDREW B. DAVIS.

Witnesses:
 RUFUS R. RHODES,
 A. BARBARIN.